(12) United States Patent
Lambert et al.

(10) Patent No.: US 8,885,820 B1
(45) Date of Patent: Nov. 11, 2014

(54) KEY EXPANSION USING SEED VALUES

(71) Applicant: Marvell International Ltd., Hamilton (BM)

(72) Inventors: Paul A. Lambert, Mountain View, CA (US); Minda Zhang, Westford, MA (US)

(73) Assignee: Marvell International Ltd. (BM)

( * ) Notice: Subject to any disclaimer, the term of this patent is extended or adjusted under 35 U.S.C. 154(b) by 0 days.

(21) Appl. No.: 13/759,137

(22) Filed: Feb. 5, 2013

Related U.S. Application Data

(60) Provisional application No. 61/596,935, filed on Feb. 9, 2012.

(51) Int. Cl.
*H04L 9/00* (2006.01)
*H04L 9/32* (2006.01)
*G06F 12/14* (2006.01)

(52) U.S. Cl.
CPC ................................ *G06F 12/1408* (2013.01)
USPC ............................... 380/44; 380/46; 713/189

(58) Field of Classification Search
CPC .............. H04L 9/08; H04L 9/22; H04L 9/12; G06F 21/72; G06F 21/86
USPC .................... 380/262, 277, 44, 46; 713/189, 713/193–194; 726/26
See application file for complete search history.

(56) References Cited

U.S. PATENT DOCUMENTS

| | | | |
|---|---|---|---|
| 5,200,999 A * | 4/1993 | Matyas et al. ................. | 380/277 |
| 5,602,917 A * | 2/1997 | Mueller ......................... | 380/284 |
| 6,895,504 B1 * | 5/2005 | Zhang et al. ................... | 713/175 |
| 7,111,322 B2 * | 9/2006 | Slick et al. ........................ | 726/5 |
| 2005/0232415 A1 * | 10/2005 | Little et al. ...................... | 380/28 |

* cited by examiner

*Primary Examiner* — Hosuk Song

(57) ABSTRACT

Systems, methods, and other embodiments associated with reducing storage space used for cryptographic keys in a memory are described. According to one embodiment, an apparatus includes a non-volatile memory. The apparatus includes key logic configured to expand a seed value to form a key. The seed value is a sequence of random bits. The apparatus includes inspection logic configured to inspect the key to determine whether the key is valid for use as a cryptographic key. The key logic is configured to store the seed value in the non-volatile memory if the key is valid, and if the key is not valid, the key logic is configured to modify the seed value to form a modified seed value, to generate a new key from the modified seed value, and to repeat inspecting the new key and modifying the seed value until a valid key is determined.

17 Claims, 3 Drawing Sheets

KEY EXPANSION USING SEED VALUES

CROSS REFERENCE TO RELATED APPLICATIONS

This patent disclosure claims the benefit of U.S. provisional application Ser. No. 61/596,935 filed on Feb. 9, 2012, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Securing communications against tampering and unauthorized use is increasingly difficult as new forms of electronic communication proliferate. For example, sensitive information that might be subject to fraudulent use is often communicated over insecure channels. To provide a measure of security for the sensitive information, devices use cryptographic algorithms to secure the sensitive information before it is conveyed over the insecure channels. However, as the performance of available computer technology continues to increase (e.g., due to development of faster microprocessors), cryptographic algorithms become increasingly vulnerable to compromise or attack. More sophisticated cryptographic algorithms are continually developed to meet the threat posed by new types of attacks. However, as cryptographic algorithms become increasingly powerful, they often use more computing resources.

One example of a way to improve a cryptographic algorithm's security is to use longer keys. Traditionally, a cryptographic algorithm may have used a key that was, for example, 128 bits. However, newer more secure cryptographic algorithms can use keys that are, for example, one-thousand or more bits. Thus, storing several cryptographic keys can consume a large amount of storage, which can be especially costly in mobile devices with limited storage. Consequently, securing sensitive data can increase costs for mobile and other devices.

SUMMARY

In general, in one aspect this specification discloses an apparatus. The apparatus includes a non-volatile memory. The apparatus includes key logic configured to expand a seed value to form a key. The seed value is a sequence of random bits. The apparatus includes inspection logic configured to inspect the key to determine whether the key is valid for use as a cryptographic key by determining whether the key complies with a set of predefined criteria. The key logic is configured to store the seed value in the non-volatile memory if the key is valid, and if the key is not valid, the key logic is configured to modify the seed value to form a modified seed value, to generate a new key from the modified seed value, and to repeat inspecting the new key and modifying the seed value until a valid key is determined to comply with the predefined criteria.

In general, in another aspect, this specification discloses a method. The method includes expanding, by a hardware component in a device, a seed value to form a key. The seed value is a sequence of random bits. The method includes inspecting the key to determine whether the key is valid for use as a cryptographic key by determining whether the key complies with predefined criteria. The method includes storing the seed value in a non-volatile memory if the key is valid. The method includes modifying the seed value to form a modified seed value and generating a new key from the modified seed value, if the key is not valid. The seed value is modified and the new key is generated until the new key complies with the predefined criteria.

In general, in another aspect, this specification discloses a non-transitory computer-readable medium storing computer executable instructions that when executed by an electronic device cause the electronic device to perform a method. The method includes expanding, by a hardware component in the electronic device, a seed value to form a key. The seed value is a sequence of random bits. The method includes inspecting, by a hardware component in the electronic device, the key to determine whether the key is valid for use as a cryptographic key by determining whether the key is secure. The method includes storing the seed value in a non-volatile memory, if the key is valid. The method includes modifying the seed value to form a modified seed value and generating a new key from the modified seed value, if the key is not valid. The seed value is modified and the new key is generated until the new key is determined to be secure.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with reducing storage space used for cryptographic keys in a memory. As computing power increases, securing data against malicious attacks becomes more difficult. As previously stated, one way to better secure data is to use longer cryptographic keys. For example, traditionally a cryptographic key may have been 128 bits in length. However, with increased processing capabilities, modern computers are better able to crack data that has been encrypted with shorter keys (e.g., a 128 bit key). Therefore, many encryption standards now use keys that are longer than 128 bits. While the longer keys provide stronger encryption, storing the longer keys consumes more space in memory.

In general, memory space is a valuable commodity, especially in mobile devices and in other devices where the memory is embedded within a circuit (e.g., within a processor). Accordingly, in one embodiment, a device is described herein that stores a smaller seed value that is used to generate a cryptographic key, instead of storing the cryptographic key itself. In this way, the device efficiently uses memory space by reducing an amount of memory for cryptographic key storage.

Figure 1:
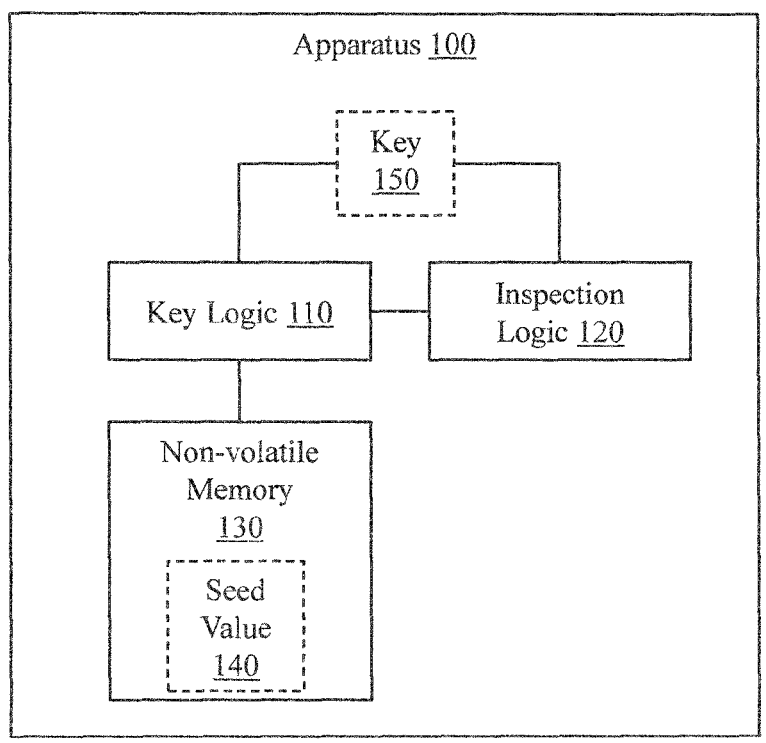
FIG. 1 illustrates one embodiment of an apparatus associated with reducing storage space used for cryptographic keys in a memory.

With reference to FIG. 1, one embodiment of an apparatus 100 associated with determining and storing seed values is illustrated. In one embodiment, the apparatus 100 is a mobile device, a cell phone, a smart phone, a tablet computer, a laptop, or other computer that uses cryptographic keys to encrypt and decrypt data. The apparatus 100 includes key logic 110, inspection logic 120, and a non-volatile memory 130. The non-volatile memory 130 is illustrated as storing a seed value 140. In one embodiment, the non-volatile memory 130 stores a plurality of seed values that include seed value 140, which is used in the following examples.

The apparatus 100 is also shown with a key 150. The key 150 is, for example, a cryptographic key that is stored in a random access memory (RAM) or other working memory of the apparatus 100 for use when encrypting data and/or communications. The key 150 can be either a symmetric key or, one or both keys of an asymmetric key pair used in a public key infrastructure (PKI). The apparatus 100 uses the key 150 to, for example, encrypt wireless communications with a remote device (not illustrated). While only the single key 150 is illustrated, in one embodiment, the apparatus 100 includes a plurality of keys for securing different data and/or communications. In general, each key used by the apparatus 100 has a corresponding seed value stored in the non-volatile memory 130. For purposes of brevity, the apparatus 100 will be discussed with a single key (i.e., key 150) and a single seed value (i.e., seed value 140).

In one embodiment, the seed value 140 is a random sequence of bits that are selected by the key logic 110. The seed value 140 is used to generate the key 150. For example, the key logic 110 uses the seed value 140 as an input to a function that generates the key 150. The function is a deterministic function that reproduces the key 150 whenever the seed value 140 is supplied as an input. The function may be a hash function, key expansion function, an elliptic curve cryptography (ECC) function, or other cryptographic function that generates keys. For example, the key logic 110 can be configured to repeatedly apply a hash function to the seed value 140 and concatenate the results of each round of the hash function to form the key 150. An input to each round of the hash function can be a slightly varied form of the seed value 140 that is known to the key logic 110 or, for example, each round of the hash function can apply a known (predefined) offset to the seed value 140 in order to get a different result from each round and not a repeating result. One example of the function is shown with equation 1.

$$\text{Key}(s) = \text{hash}(s,1) \| \text{hash}(s,2) \| \text{hash}(s,3) \| \ldots \text{hash}(s,n) \quad (1)$$

In equation (1), the seed value 140 ($s$) and an additional value (e.g., 1, 2, 3 . . . n) are processed by a hash function and then concatenated to form the key 150. The additional value can be different for each round, the same for each round, or determined by a function. But in any case, the additional value should be determinable so that the key can be reproduced by knowing the seed value 140 ($s$) and the function.

Additionally, depending on a desired length for the key, the hash is repeated a number of times (n) until the key logic 110 achieves the desired length by concatenating the result of each round of the hash. A length of the seed value 140 is a fraction of the length of the key 150. For example, the key logic 110 generates the seed value 140 as a random sequence of bits that is 128 bits in length. In comparison to the key 150, the seed value may be ⅛ as long as the key 150. While this disclosure generally discusses the seed value 140 as being 128 bits, the seed value 140 can be other lengths (e.g., 64 bits, 256 bits, etc.) depending on the implementation. Of course the key 150 can also be different lengths. For example, the key 150 can be 1,024 bits in length, 2,048 bits in length, 4,096 bits in length, and so on. In general, the key logic 110 uses the function to expand the shorter seed value 140 to form the longer key 150.

To continue with the above example of the seed value 140 as 128 bits and the key 150 as 1024 bits, eight seed values can be stored in the same space that a single key 150 could be stored. Thus, by storing the seed value 140 instead of the full length key 150, the apparatus 100 saves space in the non-volatile memory 130. The full length key 150 can then be reproduced using the function and the seed value 140.

However, every seed value that the key logic 110 generates might not form a valid key when processed through the function. That is, for example, some keys that are formed from some seed values will not have characteristics that make them secure or otherwise valid as a seed value when used with a cryptographic function to encrypt data. Accordingly in one embodiment, before storing the seed value 140 in the non-volatile memory 130, the inspection logic 120 is configured to inspect the key 150 generated by the key logic 110 to determine whether the key 150 is usable as a cryptographic key and thus also whether the seed value 140 is valid (e.g., secure or correct as a key). In one embodiment, the inspection logic 120 is configured to inspect the key 140 by determining whether the key 150 complies with one or more cryptographic standards or desired conditions.

The inspection logic 120 determines whether the key 150 complies with a cryptographic standard by, for example, checking or verifying selected characteristics of the key 150. This may include checking whether the key 150 is a prime number, checking whether the key 150 is a semi-prime number, checking whether the key 150 is co-prime with a number (e.g., a public key of an asymmetric key pair), checking that a length of the key 150 is of a sufficient length (e.g., 1024 bits), or a combination of these elements. The standards or conditions that the key is compared to can include, for example, the advanced encryption standard (AES), an elliptical curve cryptography (ECC) standard for keys, the Rivest, Shamir, and Adleman (RSA) algorithm standard, IEEE 802.11i, IEEE 802.11, Wi-Fi Protected Access (WPA), Wi-Fi Protected Access 2 (WPA2), Wireless Equivalent Protection (WEP), Robust Security Network (RSN), and so on.

If the key 150 does not comply with the standard, then the seed value 140 that expands into the key 150 is not stored in the non-volatile memory 130. Instead, the key logic 110 is configured to select a new seed value or to modify the seed value 140 to form a modified seed value 140. The key logic 110 repeats the process of generating a new/modified seed value 140 and expanding the modified seed value 140 to form the key 150 until the inspection logic 120 determines that the key 150 is a valid/correct key (e.g., secure).

To generate a new seed value, the key logic 110 is configured to, for example, use a pseudorandom number generator to generate the seed value 140 or use a similar function to select a seed value that complies with a predefined set of criteria. The predefined set of criteria can include selecting a seed value of a specified length (e.g., 128 bits), selecting a seed value that is a prime number, selecting a seed value that is semi-prime or co-prime with a second number, and so on. In general, the seed value is selected to have properties that ensure it to be a cryptographically strong value. The properties are in some instances similar to or the same as those properties required for a key to be considered secure or comply with a cryptographic standard or condition.

Similarly, the key logic 110 is configured to modify the seed value 140 in a way that is likely to produce a key that is correct/valid (e.g., secure). For example, the key logic 110 can be configured to modify the seed value 140 by adjusting the seed value 140 to be a prime number if the seed value 140 is initially an even number. The key logic 110 can also modify the seed value 140 to be a prime number or the key logic 110 can modify the seed value 140 by adding an arbitrary offset value. Generating and modifying the seed value is be discussed in greater detail with reference to FIG. 2.

Figure 2:
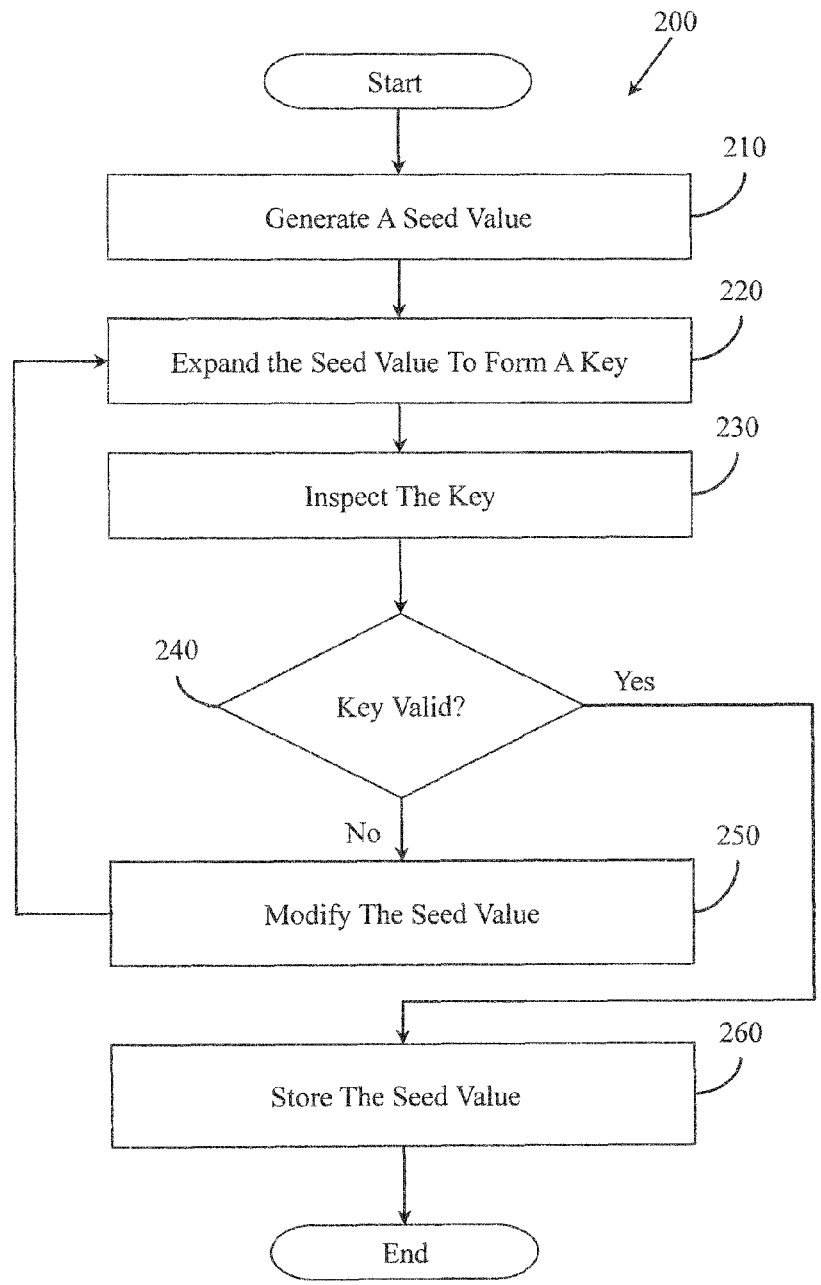
FIG. 2 illustrates one embodiment of a method associated with reducing storage space used for cryptographic keys in a memory.

FIG. 2 illustrates one embodiment of a method 200 associated with generating and storing seed values that are used to form cryptographic keys. The method 200 will be discussed from the perspective of the apparatus 100 of FIG. 1.

At 210, the apparatus 100 generates a seed value that has a selected length. In one embodiment, the seed value is a 128 bit sequence of random bits. The apparatus 100 generates the seed value using a pseudorandom number generator (PRNG) or a function that generates the seed value according to a set of predefined criteria. The predefined criteria include, for example, a required length (i.e., 128 bits) for the seed value, whether the seed value is to be an odd or even number, whether the seed value is to be a prime number, whether the seed value is to be a multiple or factor of another number, whether the seed value is to be a semi-prime number, whether the seed value is to be co-prime with another number, and so on. In one embodiment, the initial seed value from block 210 may not be generated on the fly by the apparatus 100. Instead, the generating action may include retrieving the seed value that is pre-loaded or pre-computed in the apparatus, or the seed value can be received in a communication from another device (e.g., a remote device sends seed value via a wireless connection).

At 220, the apparatus 100 expands the seed value to form a key. In one embodiment, the apparatus 100 uses a deterministic function to expand the seed value from a 128 bit length into the key, which is at least 1024 bits in length. The deterministic function is, for example, a cryptographic expansion function, a hash function, a key stretching function, or a similar function that receives a 128 bit value as input and provides a 1024 bit or longer value as output. The resulting key is to be used by the apparatus 100 for securing data in communications with other devices to, for example, secure information stored within the apparatus 100, to generate unique IDs, and so on.

At 230, because not every seed value will produce a valid cryptographic key (i.e., a key that complies with a particular cryptographic standard, e.g., RSA), the apparatus 100 inspects the key to determine whether the key is a valid key (e.g., secure). The apparatus 100 determines whether the key is secure by checking and comparing whether the key complies with selected criteria. Examples may include checking if the key is a prime number, a co-prime number, or more generally by ensuring the key complies with specifics of a standard or other defined condition with which the key is to be used.

At 240, if the key is valid by complying with the selected criteria, then the method 200 proceeds to 260 where the apparatus 100 stores the seed value in a non-volatile memory. In this way, the apparatus 100 stores seed values and can eliminate storing full length keys in non-volatile memory. Consequently, the apparatus 100 saves space within the non-volatile memory since the seed value is a fraction of the length of the key (e.g., 128 bits vs. 1024 bits). Additionally, the apparatus 100 can re-generate the key whenever desired or upon being initialized using the seed value with the function. The key can be re-generated since the function is deterministic and produces the same result when provided with the same seed value as input. Thus, the apparatus 100 can then store the keys in a working memory (e.g., a RAM) after generating the keys from the seed values and use the non-volatile memory to store seed values.

If at 240, apparatus 100 determines that the key is not valid (i.e., not secure) according to the selected criteria, then the apparatus 100 proceeds to block 250. At block 250, the apparatus 100 modifies the invalid seed value that was initially used to generate the key at block 220. In one embodiment, the apparatus 100 modifies the invalid seed value with a selected function. This may include incrementing the seed value by a predetermined value, by incrementing the seed value to be an odd number if the seed value was even, by changing the seed value to be a prime number if the seed value was previously not prime, or by selecting a new seed value using, for example, the pseudorandom number generator discussed at block 210.

After the seed value is modified at 250 to form a modified seed value, the process of expanding is repeated (i.e., at 220) using the modified seed value instead of the original seed value and a new key is formed. The apparatus 100 inspects the new key at 230 to determine whether the new key is secure. If the new key is secure, then the apparatus proceeds to store the modified seed value at 260. Alternatively, if the new key is not valid, then the process iteratively repeats between 250, 220, and 230 until a new key is determined to be valid at 240, at which point an associated seed value is stored in the non-volatile memory (e.g., non-volatile memory 130) and the method 200 ends.

Of course the method 200 may be used to store more than a single seed value. That is, for each key used by the apparatus 100, a separate seed value may be stored in a non-volatile memory (e.g., the non-volatile memory 130). For example, if the apparatus 100 uses 10 different keys, then 10 different seed values are stored in the non-volatile memory each of which is processed through the method 200. Consider that storing 10 seed values (e.g., 128 bit seed values) instead of 10 full length keys (e.g., 1024 bit keys) uses 1280 bits of memory instead of 10,240 bits of memory if the keys were stored. This space savings permits the apparatus 100 to use much larger keys and/or many more keys without consuming a large amount of memory space. Accordingly, the apparatus 100 can better secure communications using longer keys (e.g., 1024 bit, 2048 bit, 4096 bit, and so on).

To provide another example of memory space savings, consider an example where the apparatus 100 uses keys having a length of 4096 bits. In this example, while a key is 4096 bits, a seed value can be generated at a fraction of the size such as only 128 bits (e.g., $\frac{1}{32}$ of the key length). Accordingly, if the apparatus 100 uses 10 keys that are 4096 bits in length, then the apparatus 100 stores 10 seed values that correspond to the 10 keys. In this case, the amount of space for storing the 10 seed values is 1280 bits, while the amount of space that would be needed to store the 10 keys would be 40,960 bits. Accordingly, in this example, the apparatus 100 stores 32 times less data or 39,680 less bits by storing the seed values instead of the keys. Consequently, the apparatus is capable of using more keys and also using keys that are longer, therefore, providing more security.

In one embodiment, method 200 is performed by one or more hardware components of an electronic device that may be implemented in circuitry, digital logic, firmware, and/or combinations of these. In one embodiment, the electronic device is the apparatus 100 or is a component within apparatus 100.

Figure 3:
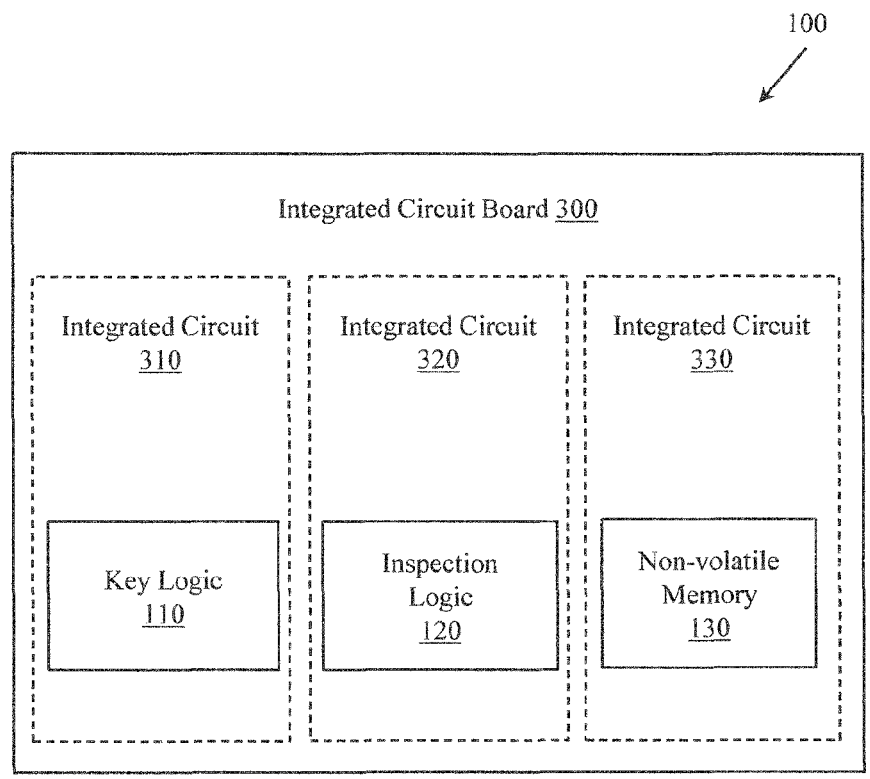
FIG. 3 illustrates one embodiment of an integrated circuit associated with reducing storage space used for cryptographic keys in a memory.

FIG. 3 illustrates another embodiment of the apparatus 100 from FIG. 1 that is configured with separate integrated circuits and/or chips. In this embodiment, the key logic 110 from FIG. 1 is embodied as a separate integrated circuit 310. Additionally, the inspection logic 120 is an individual integrated circuit 320. Furthermore, the non-volatile memory 130 is also embodied on an individual integrated circuit 330. The circuits are connected via connection paths to communicate signals.

While integrated circuits 310, 320, 330 are illustrated as separate integrated circuits, they may be integrated into a common circuit board 300. Additionally, integrated circuits 310, 320, and 330 may be combined into fewer integrated circuits or divided into more integrated circuits than illustrated. Additionally, in another embodiment, the logics 110 and 120 illustrated in integrated circuit 310 and 320 may be separate circuits or combined into a separate application specific integrated circuit. In other embodiments, the functionality associated with the logics 110 and 120 can be embodied as firmware executable by a processor.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
a non-volatile memory;
key logic configured to expand a seed value to form a key, wherein the seed value is a sequence of random bits;
inspection logic configured to inspect the key to determine whether the key is valid for use as a cryptographic key by determining whether the key complies with a set of predefined criteria; and
wherein the key logic is configured to store the seed value in the non-volatile memory if the key is valid, and if the key is not valid, the key logic is configured to modify the seed value to form a modified seed value, to generate a new key from the modified seed value, and to repeat inspecting the new key and modifying the seed value until a valid key is determined to comply with the predefined criteria, and wherein the key logic is configured to expand the seed value into the key by applying a deterministic function to the seed value.

2. The apparatus of claim 1, wherein the key logic is configured to modify the seed value by selecting a new seed value as the modified seed value, wherein a length of the key is a multiple of a length of the seed value, and wherein the key logic is configured to store the seed value in the non-volatile memory and to not store the key.

3. The apparatus of claim 1, wherein the key logic is configured to modify the seed value by adjusting the seed value to ensure the modified seed value is a prime number.

4. The apparatus of claim 1, wherein the apparatus is configured to re-generate the key using a deterministic function with the seed value upon being initialized.

5. The apparatus of claim 1, wherein the inspection logic is configured to inspect the key by determining whether the key complies with the predefined criteria that includes one or more cryptographic standards.

6. The apparatus of claim 1, wherein the key is one or more keys of an asymmetric key pair for a public key infrastructure, and wherein the apparatus uses the key to encrypt communications that are communicated wirelessly between the apparatus and a remote device; and
wherein the inspection logic is configured to inspect the key by checking whether the key is a prime number.

7. A method, comprising:
expanding, by a hardware component in a device, a seed value to form a key, wherein the seed value is a sequence of random bits;
inspecting the key to determine whether the key is valid for use as a cryptographic key by determining whether the key complies with predefined criteria;

if the key is valid, storing the seed value in a non-volatile memory; and if the key is not valid, modifying the seed value to form a modified seed value and generating a new key from the modified seed value, wherein the seed value is modified and the new key is generated until the new key complies with the predefined criteria, and wherein generating the key by expanding the seed value into the key includes applying a deterministic function to the seed value.

8. The method of claim 7, wherein modifying the seed value includes selecting a new seed value as the modified seed value.

9. The method of claim 7, wherein modifying the seed value includes adjusting the seed value to generate the modified seed value as a prime number.

10. The method of claim 7, wherein the device re-generates the key using a deterministic function with the seed value when the device is initialized.

11. The method of claim 7, wherein inspecting the key includes determining whether the key complies with one or more cryptographic standards.

12. The method of claim 7, wherein inspecting the key includes checking whether the key is a prime number, wherein the key is an asymmetric key pair for a public key infrastructure, and wherein the key is used to encrypt communications that are communicated wirelessly between the device and a remote device.

13. The method of claim 7, wherein a length of the key is a multiple of a length of the seed value, wherein the multiple is at least eight, and wherein storing the seed value in the non-volatile memory includes storing the seed value instead of the key.

14. A non-transitory computer-readable medium storing computer executable instructions that when executed by an electronic device cause the electronic device to perform a method, the method comprising:

expanding, by a hardware component in the electronic device, a seed value to form a key, wherein the seed value is a sequence of random bits;

inspecting, by a hardware component in the electronic device, the key to determine whether the key is valid for use as a cryptographic key by determining whether the key is secure;

if the key is valid, storing the seed value in a non-volatile memory; and if the key is not valid, modifying the seed value to form a modified seed value and generating a new key from the modified seed value, wherein the seed value is modified and the new key is generated until the new key is determined to be secure, and wherein generating the key by expanding the seed value into the key includes applying a deterministic function to the seed value.

15. The non-transitory computer-readable medium of claim 14, wherein modifying the seed value includes selecting a new seed value as the modified seed value.

16. The non-transitory computer-readable medium of claim 14, wherein inspecting the key includes determining whether the key complies with one or more cryptographic conditions, wherein the key is an asymmetric key pair for a public key infrastructure, and wherein the key is used to encrypt communications that are communicated wirelessly between the computer and a remote device.

17. The non-transitory computer-readable medium of claim 14, wherein the electronic device re-generates the key using a deterministic function and the seed value when the electronic device is initialized, wherein a length of the key is a multiple of a length of the seed value, wherein the multiple is at least eight, and wherein storing the seed value in the non-volatile memory includes storing the seed value instead of the key.

\* \* \* \* \*